US011956782B2

(12) United States Patent
Shilov et al.

(10) Patent No.: US 11,956,782 B2
(45) Date of Patent: Apr. 9, 2024

(54) RESOURCE ALLOCATION AND PROCESSING BEHAVIORS FOR NR V2X SIDELINK COMMUNICATIONS

(71) Applicant: Apple Inc., Cupertino, CA (US)

(72) Inventors: Mikhail Shilov, Nizhny Novgorod (RU); Alexey Khoryaev, Volga (RU); Sergey Panteleev, NIZ (RU); Andrey Chervyakov, Nizhegorodsky (RU); Dmitry Belov, NIZ (RU)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 17/287,754

(22) PCT Filed: Nov. 1, 2019

(86) PCT No.: PCT/US2019/059436
§ 371 (c)(1),
(2) Date: Apr. 22, 2021

(87) PCT Pub. No.: WO2020/092931
PCT Pub. Date: May 7, 2020

(65) Prior Publication Data
US 2021/0400650 A1  Dec. 23, 2021

Related U.S. Application Data

(60) Provisional application No. 62/755,344, filed on Nov. 2, 2018.

(51) Int. Cl.
*H04W 72/20* (2023.01)
*H04W 4/40* (2018.01)
*H04W 24/08* (2009.01)

(52) U.S. Cl.
CPC ............. *H04W 72/20* (2023.01); *H04W 4/40* (2018.02); *H04W 24/08* (2013.01)

(58) Field of Classification Search
CPC ....... H04W 72/20; H04W 4/40; H04W 24/08; H04W 72/02; H04L 5/0094; H04L 5/0053
See application file for complete search history.

(56) References Cited

U.S. PATENT DOCUMENTS 11,546,743 B2 * 1/2023 Shilov ................... H04L 5/001
2018/0359659 A1 * 12/2018 Cai ....................... H04W 72/02
(Continued)

FOREIGN PATENT DOCUMENTS

| CN | 104938014 | 9/2015 |
| CN | 106535338 | 3/2017 |

(Continued)

OTHER PUBLICATIONS

ETRI, "Sidelink Design for NR V2X", 3GPP TSG RAN WG1, Meeting 94, R1-1809498, Aug. 2018, Gothenburg, Sweden, 7 pgs.
(Continued)

*Primary Examiner* — Abdullahi Ahmed
(74) *Attorney, Agent, or Firm* — Kowert, Hood, Munyon, Rankin & Goetzel, P.C.

(57) ABSTRACT

An apparatus of user equipment (UE) includes processing circuitry coupled to a memory, where to configure the UE for New Radio (NR) vehicle-to-everything (V2X) sidelink communication. The processing circuitry is to determine a set of candidate resources of the UE from a sidelink resource pool, the sidelink resource divided into multiple time slots, frequency channels, and frequency sub-channels. Sidelink control information (SCI) is encoded for transmission to a second UE via a physical sidelink control channel (PSCCH). The SCI indicates a plurality of transmission resources of the set of candidate resources. A transport block is mapped across the plurality of transmission resources. A physical sidelink shared channel (PSSCH) is encoded for transmission to the second UE using the plurality of transmission resources, the PSSCH encoded to include the mapped transport block.

20 Claims, 7 Drawing Sheets

(56) References Cited

U.S. PATENT DOCUMENTS

| | | | | |
|---|---|---|---|---|
| 2019/0394786 A1* | 12/2019 | Parron | .................. | H04L 5/0032 |
| 2020/0366419 A1* | 11/2020 | Panteleev | ............. | H04L 1/1854 |
| 2020/0374860 A1* | 11/2020 | Panteleev | ............. | H04L 5/0044 |
| 2020/0374861 A1* | 11/2020 | Shilov | .................. | H04W 72/20 |
| 2021/0127364 A1* | 4/2021 | Panteleev | ............. | H04L 1/1819 |
| 2021/0219268 A1* | 7/2021 | Li | ........................ | H04W 72/20 |

FOREIGN PATENT DOCUMENTS

| | | |
|---|---|---|
| WO | 2017176097 | 10/2017 |
| WO | 2017176099 | 10/2017 |
| WO | 2018006313 A1 | 1/2018 |
| WO | 2018093939 | 5/2018 |

OTHER PUBLICATIONS

Intel Corporation, "Sidelink Resource Allocation Mechanisms for NR V2X", 3GPP TSG RAN WG1, Meeting #94bis, R1-1810775, Oct. 2018, Chengdu, China, 15 pgs.

Ericsson, "Further Discussion on the V2X Demodulation", 3GPP TSG-RAN WG4, #83, R4-1705630, May 2017, Hangzhou, China, 8 pgs.

International Search Report and Written Opinion for International Application No. PCT/US2019/059436, dated Feb. 26, 2020, 10 pgs.

Office Action for CN Patent Application No. 2019800714638; dated Oct. 27, 2023.

\* cited by examiner

US 11,956,782 B2

RESOURCE ALLOCATION AND PROCESSING BEHAVIORS FOR NR V2X SIDELINK COMMUNICATIONS

PRIORITY CLAIM

This application is a U.S. National Stage filing of International Application No. PCT/US2019/059436, filed Nov. 1, 2019, entitled "RESOURCE ALLOCATION AND PROCESSING BEHAVIORS FOR NR V2X SIDELINK COMMUNICATIONS," which claims the benefit of priority to the U.S. Provisional Patent Application Ser. No. 62/755,344, filed Nov. 2, 2018, and entitled "SIDELINK RESOURCE ALLOCATION AND USER EQUIPMENT PROCESSING BEHAVIORS FOR NEW RADIO VEHICLE TO ANYTHING SIDELINK COMMUNICATION," each of which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to systems and methods for sidelink (SL) resource allocation and user equipment (UE) processing behaviors for New Radio (NR) vehicle-to-everything (V2X) sidelink communications.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for SL resource allocation and UE processing behaviors for NR V2X sidelink communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
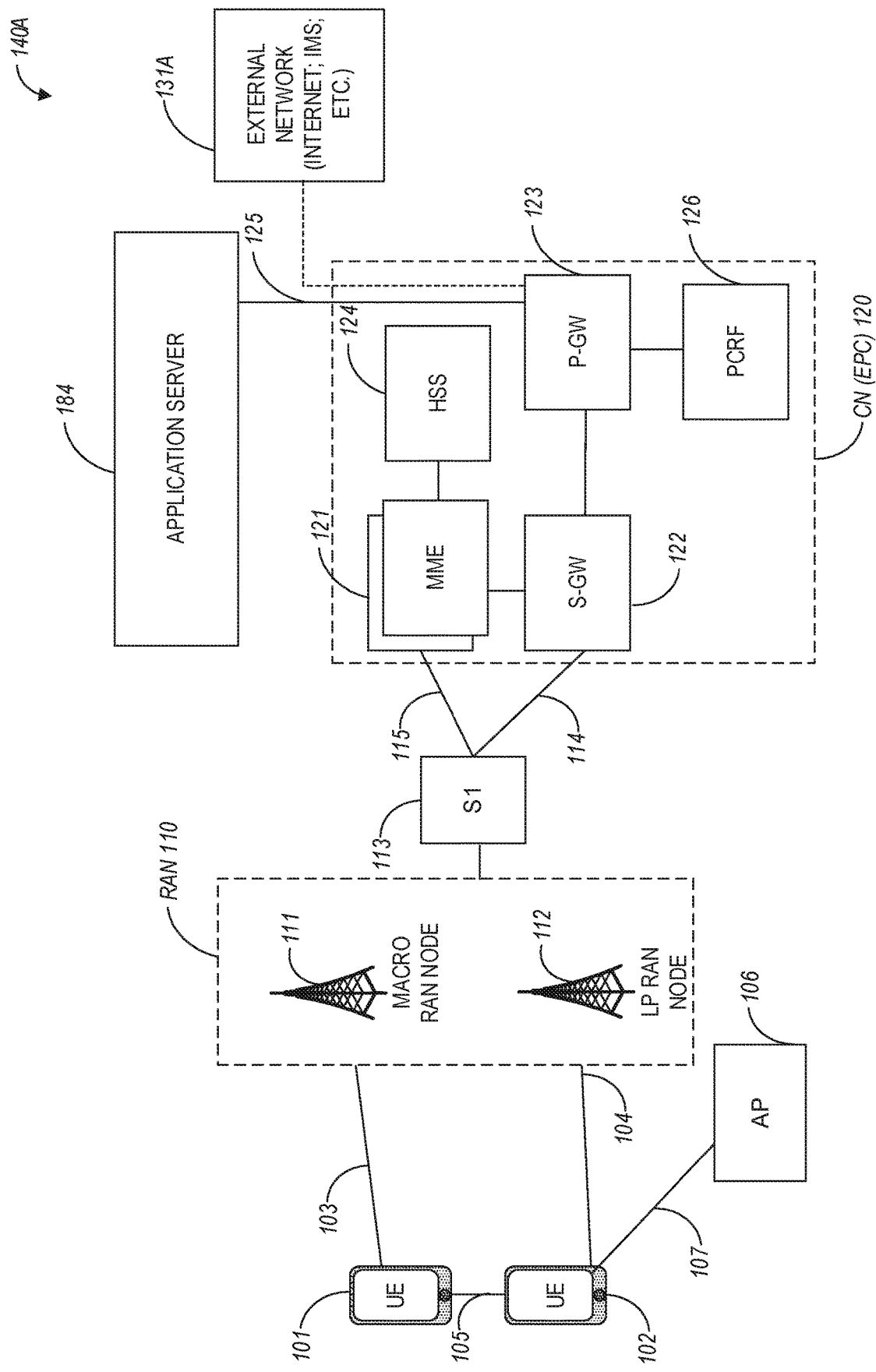
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single LT, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces. In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
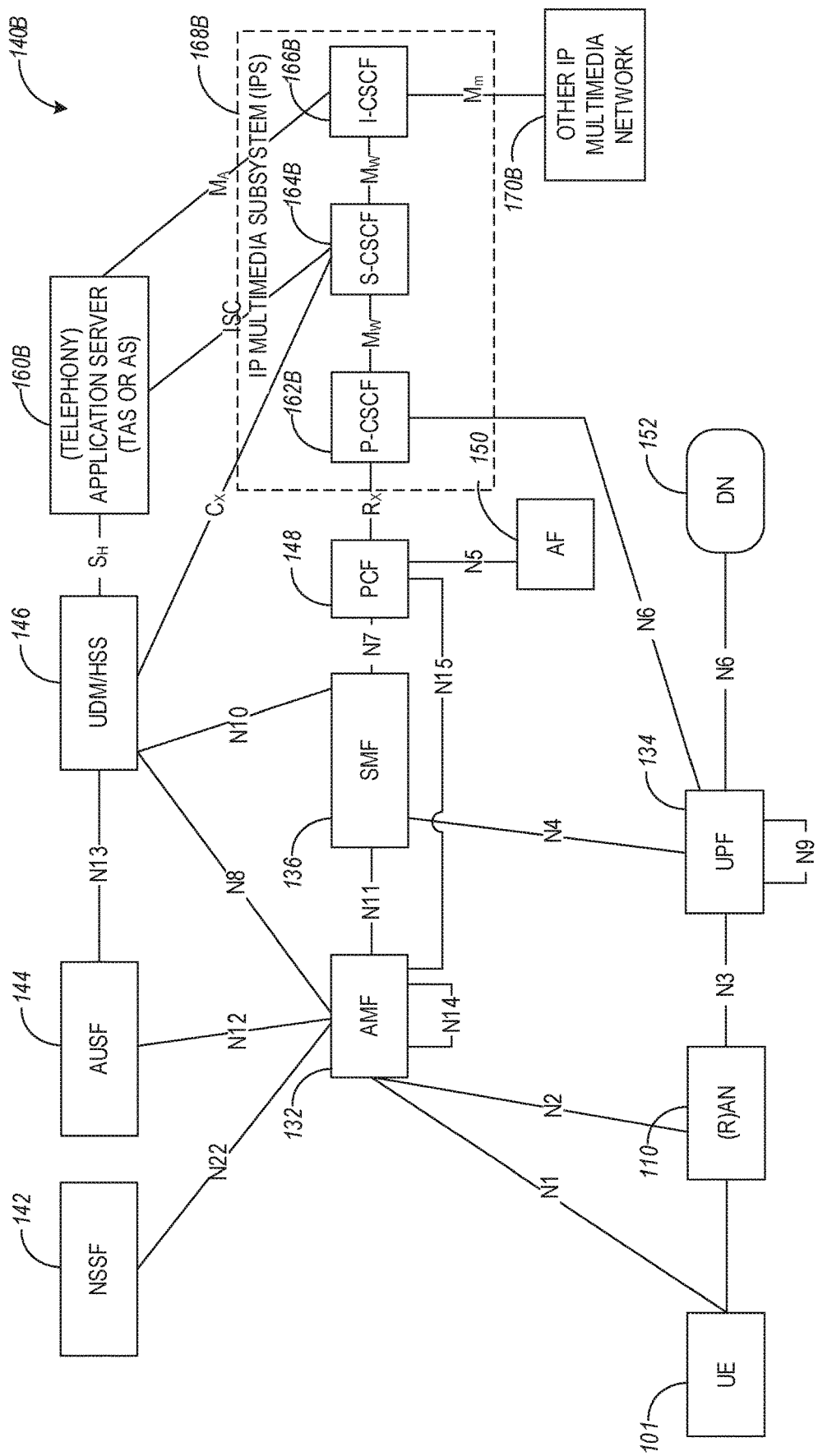
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operators network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
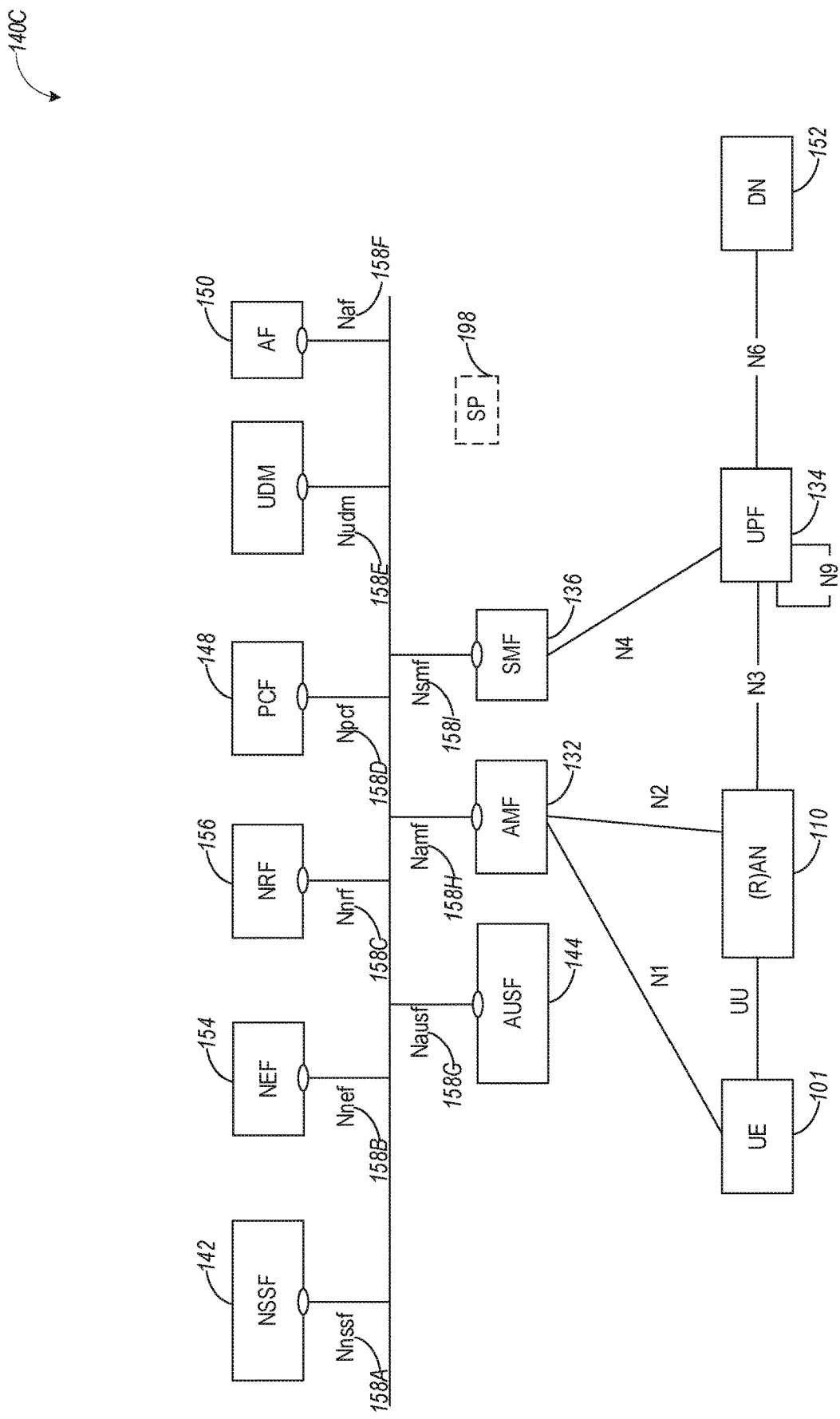

FIG. 1C illustrates a 5G system architecture 140C and a service-based representation. In addition to the network entities illustrated in FIG. system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

NR-V2X architectures may need to support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink V2X communication systems.

Conventional LTE-V2X communication systems that define radio-layer protocol for sidelink communication do not provide sufficient level of reliability and do not meet latency requirements for evolved V2X use cases. Additionally, conventional LTE-V2X communication systems may be associated with high latency, insufficient levels of reliability, sensitivity to interference, and hidden node problems.

Techniques discussed herein can be used for a sidelink resource allocation structure that provides flexibility to support periodic and aperiodic traffic with random packet arrival time and packet size while ensuring high reliability and low latency communication. Techniques discussed herein can be used for sidelink resource allocation schemes based on intelligent sensing and resource selection procedures, as well as intelligent UE processing behaviors for PSCCH and PSSCH demodulation/decoding.

Sidelink Resource Structure.

A sidelink resource pool may be divided into multiple time slots, frequency channels, and frequency sub-channels. In some embodiments, UEs may be synchronized and perform sidelink transmissions aligned with slot boundaries. A UE may be expected to select several slots and sub-channels for transmission of the transport block. In some aspects, a UE may use different sub-channels for transmission of the transport block across multiple slots within its own resource selection window, which may be determined using packet delay budget information. In one embodiment, a UE can use discontinuous transmission in time (total TX duration for one transport block (TB) is N slots, e.g., N=1, 2, 3, 4, . . . ) with channel access granularity equal to one slot, where channel access boundaries may be aligned from system perspective at slot level.

Figure 2:
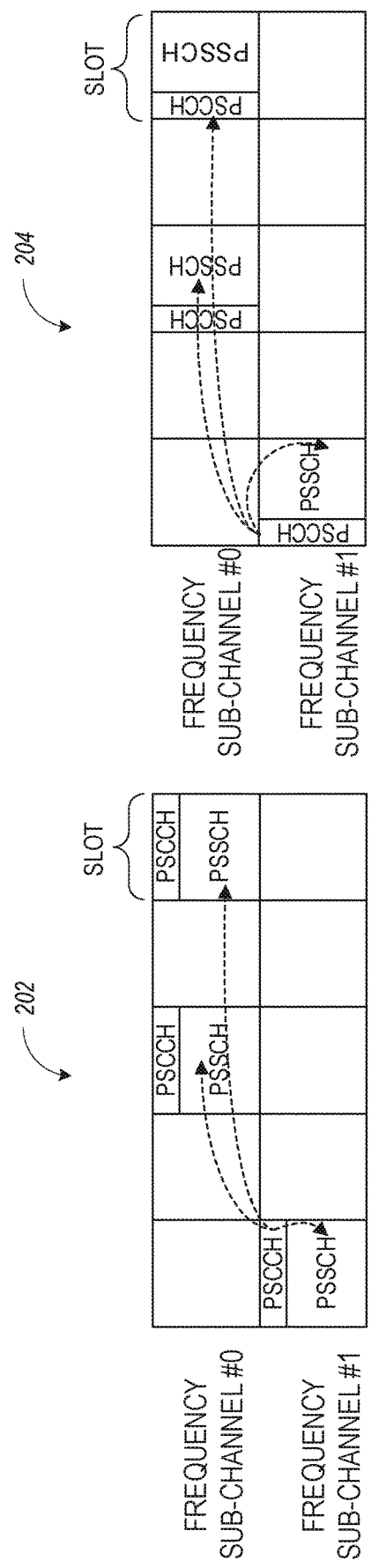
FIG. 2 illustrates physical sidelink control channel (PSCCH) and physical sidelink shared channel (PSSCH) resource allocation options, in accordance with some aspects.

FIG. 2 illustrates PSCCH and PSSCH resource allocation options, in accordance with some aspects. Referring to FIG. 2, diagram 202 illustrates frequency-division multiplexing (FDM) resource allocation of sidelink control or shared channel information, and diagram 204 illustrates time-division multiplexing (TDM) resource allocation of sidelink control or shared channel information. As illustrated in FIG. 2, each sidelink transmission includes sidelink shared channel (PSSCH) and sidelink control channel (PSCCH) transmissions. Each PSCCH transmission includes information about all other PSSCH resources used for transmission of the same transport block(s), as illustrated in diagrams 202 and 204 in FIG. 2.

UE Autonomous Resource Allocation Schemes.

Large Scale (Long-Term) Sensing.

In some aspects, the LTE-V2X sidelink sensing and resource selection procedure can be considered as an example of a large scale sensing procedure. The main motivation behind large scale sensing procedure may be to avoid transmissions on resources reserved by other UEs for periodical transmissions. In order to accomplish this task, a UE may process sidelink control channels and may perform measurements in a sensing window (allocated in the past) to determine a set of candidate resources within a resource selection window (allocated in a near-future within a latency budget). There may be N number of selected transmission resources (e.g., slots, channels, and/or sub-channels), where N is an integer greater than or equal 2 and less than 264. In some aspects, a large scale sensing procedure may provide optimal performance for periodic traffic, however it may not be optimized for aperiodic traffic. In addition, the following additional enhancements can be used as they may be beneficial even to support enhanced V2X (eV2X) periodic traffic:

(a) Reduced probability of collisions (or collision handling procedures) in case of simultaneous resource (re)-selection by different UEs;
(b) Reduced and configurable sensing window (e.g., based on maximum reservation interval in the system or even lower);
(c) Configurable resource selection window duration (e.g., derived based on packet delay budget);
(d) Refinement of candidate resource set(s) based on recently announced transmissions, if those collide with selected transmission resources;
(e) Prioritized selection of the first in time candidate resources, especially for initial transmission of TBs;
(f) Enhanced physical structure and multiplexing options for PSCCH and PSSCH;
(g) Enhanced resource (re)-selection conditions and triggers; and
(h) Priority handling enhancements.

In addition to large scale sensing, the following small scale sensing techniques may be used for support of aperiodic traffic.

Small Scale (Short Term) Sensing.

The small scale sensing may be beneficial for multiple reasons. For example, it can serve as a complementary procedure to supplement the large scale sensing procedure discussed above, to address the potential issue of collisions in case of simultaneous resource (re-)selection. Additionally, the small scale sensing may be beneficial for aperiodic traffic handling, where large scale sensing may be expected to provide degraded performance.

In some aspects, small scale sensing includes listening/sensing a communication channel before transmission, and access the channel if the sidelink resource satisfies channel access criteria or, in the alternative, perform random backoff. The small scale sensing can be done based on additional short-term/small-scale power measurements (e.g., RSSI or RSRP) or control channel processing. The support of small scale sensing requires considerations regarding the sidelink resource grid and channel access occasions. In particular, the sidelink resource grid may be divided into small channel access occasions. The granularity of large and small scale sidelink resources in time and frequency can be configurable, where a large scale resource is composed of multiple small scale resources.

In some embodiments, the following LIE autonomous resource allocation schemes may be used:

Scheme 1: Large scale (long term) sensing based on LTE Rel-14 vehicle-to-vehicle (V2V) procedure without RSSI averaging.

Scheme 2: Large scale (long term) sensing based on LTE Rel-14 V2V procedure without RSSI averaging and prioritization of the first in time candidate resource for selection (randomization is applied within N first in time candidate resources).

Scheme 3: Large scale (long term) sensing based on LTE Rel-14 V2V in combination with small scale (short term) sensing procedure. The small scale sensing procedure may additionally take into account resource reservations announced within a resource selection window (i.e., made before actual transmission of the first TTI). A UE may re-select candidate resource(s) if suitable resource(s) are available, otherwise the UE may perform transmission according to the latest resource selection decision.

Scheme 4: Large scale (long term) sensing based on LTE Rel-14 V2V in combination with small scale (short term) sensing procedure and additional short term reservation signaling preceding actual transmission of each TB. The resource for short term reservation signaling is determined based on the sensing procedure. In this case, small scale (short term) sensing procedure takes into account transmissions within a resource selection window that was made ahead of short term reservation signaling transmission. Once the short term reservation signaling is transmitted, a UE does not change resource selection decision which is announced in short term reservation signaling.

Scheme 5: Small scale (short term) sensing with small scale (short term) reservations signaling. In the case of aperiodic traffic, only Scheme 5 becomes equivalent to Scheme 4.

In some aspects, large scale (long term) sensing forms candidate set only if some of the UEs indicate long term resource reservation, which is always the case for periodic traffic. Otherwise, all resources within a resource selection window are considered as candidate resources. The latter is valid in case of aperiodic traffic, where there are no resource reservations in the longer term. However, given that each HE uses multiple TTIs for a single TB transmission, it is assumed that the first in time transmission reserves resources for remaining retransmissions. In case of periodic traffic, the small scale reservation signaling may be transmitted only during long-term resource reselection. For aperiodic traffic, the small scale reservation signaling may be transmitted for each transmitted TB.

Intelligent UE Processing Behaviors/Capabilities.

In LTE, a UE may have a limited sidelink PSCCH/PSSCH channel decoding capability that leads to the UE behavior when the UE attempts to decode only the strongest sidelink transmitter on a given PSCCH resource. Such UE behavior is suboptimal and further enhancements may be used as discussed hereinbelow.

In terms of PSSCH decoding, in each slot, the UE may select the "best" candidates for PSSCH decoding among all detected sidelink transmissions which are completed in a given slot and may use capacity or mutual information or any other metric characterizing probability of successful decoding of a given PSSCH transmission to select candidates for PSSCH decoding. This metric can be obtained based on SL-RSRP and SL-RSRQ measurements using PSSCH demodulation reference signals (DM-RSs). The UE is expected to attempt to decode PSSCHs until it reaches its PSSCH processing capability limit. The LIE may also prioritize PSSCH decoding based on QoS attributes (e.g., priority, reliability, and communication range/distance) conveyed in successfully decoded PSCCHs.

In terms of PSCCH decoding, for each slot, a UE may attempt to detect PSCCH transmissions on all PSCCH resources within the slot and can perform multiple decoding attempts per resource unless it reaches its PSCCH decoding capability limit. The UE can first detect PSCCH transmissions on each resource based on PSCCH DMRS SL-RSRP/SL-RSRQ measurements.

In general, the following UE behaviors are possible depending on UE processing capabilities/implementation:

UE Behavior 1: Single PSCCH/Single PSSCH. The number of PSCCH and PSSCH decoding attempts is equal to the number of PSCCH resources allocated/configured per slot.

UE Behavior 2: Single PSCCH/Multiple PSSCH. The number of PSCCH decoding attempts is equal to the number of PSCCH resources allocated per slot, and the number of PSSCH decoding attempts exceeds the number of PSCCH resources per slot.

UE Behavior 3: Multiple PSCCH/Single PSSCH. The number of PSCCH decoding attempts exceeds the number of PSCCH resources allocated per slot, and the number of PSSCH decoding attempts is equal to the number of PSCCH resources per slot.

UE Behavior 4: Multiple PSCCH/Multiple PSSCH. The number of PSCCH decoding attempts exceeds the number of allocated PSCCH resources per slot, and the number of PSSCH decoding attempts exceeds the number of PSCCH resources per slot.

Figure 3A:
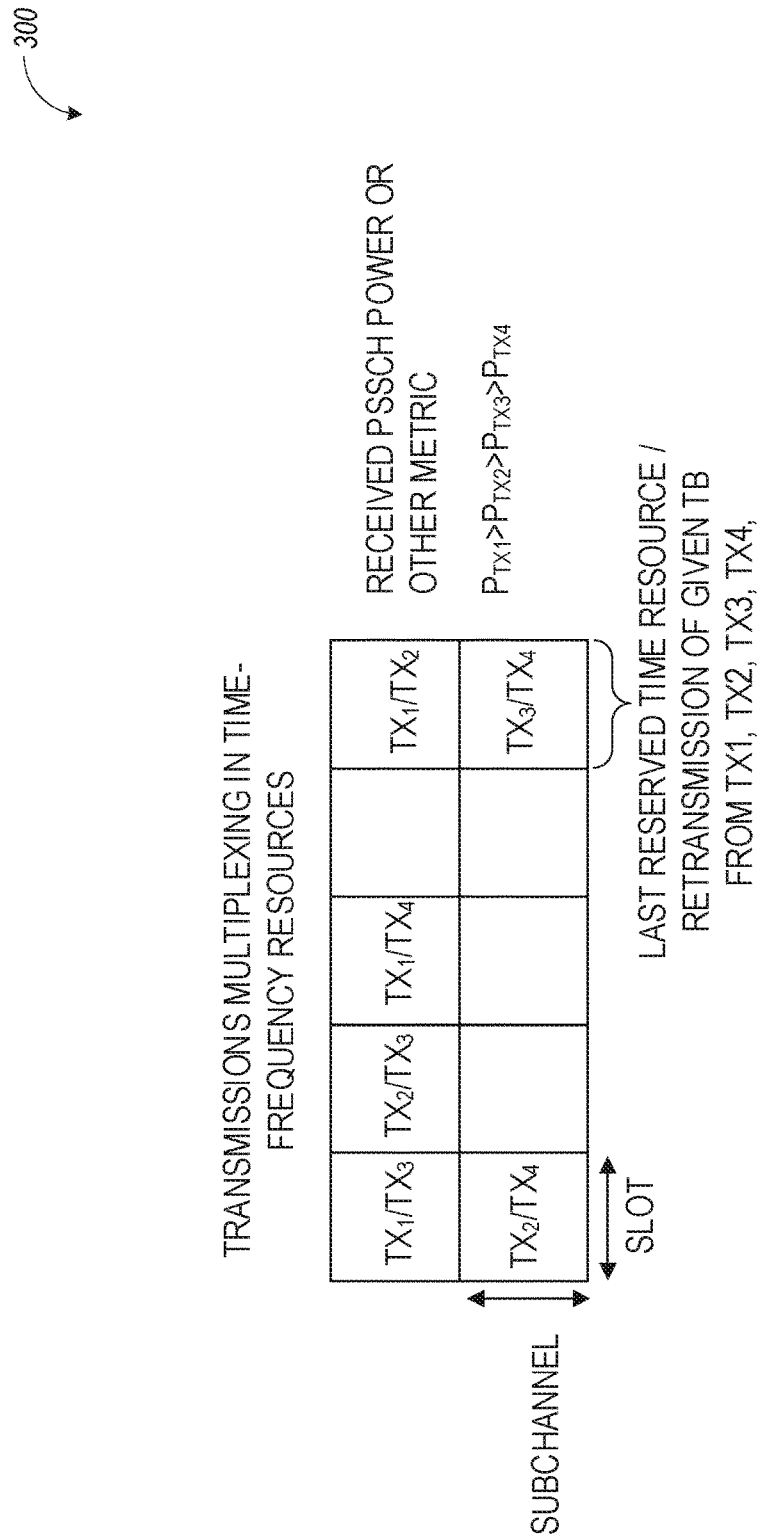
FIG. 3A illustrates a transmission resource occupancy map, in accordance with some aspects.

FIG. 3A illustrates a transmission resource occupancy map 300, in accordance with some aspects. Referring to FIG. 3, the occupancy map 300 illustrates transmissions multiplexing of transmissions TX1, TX2, TX3, and TX4 in time-frequency resources. The received PSSCH power (or other metric) for the transmissions can be $P_{tx1} > P_{tx2} > P_{tx3} > P_{tx4}$.

Figure 3B:
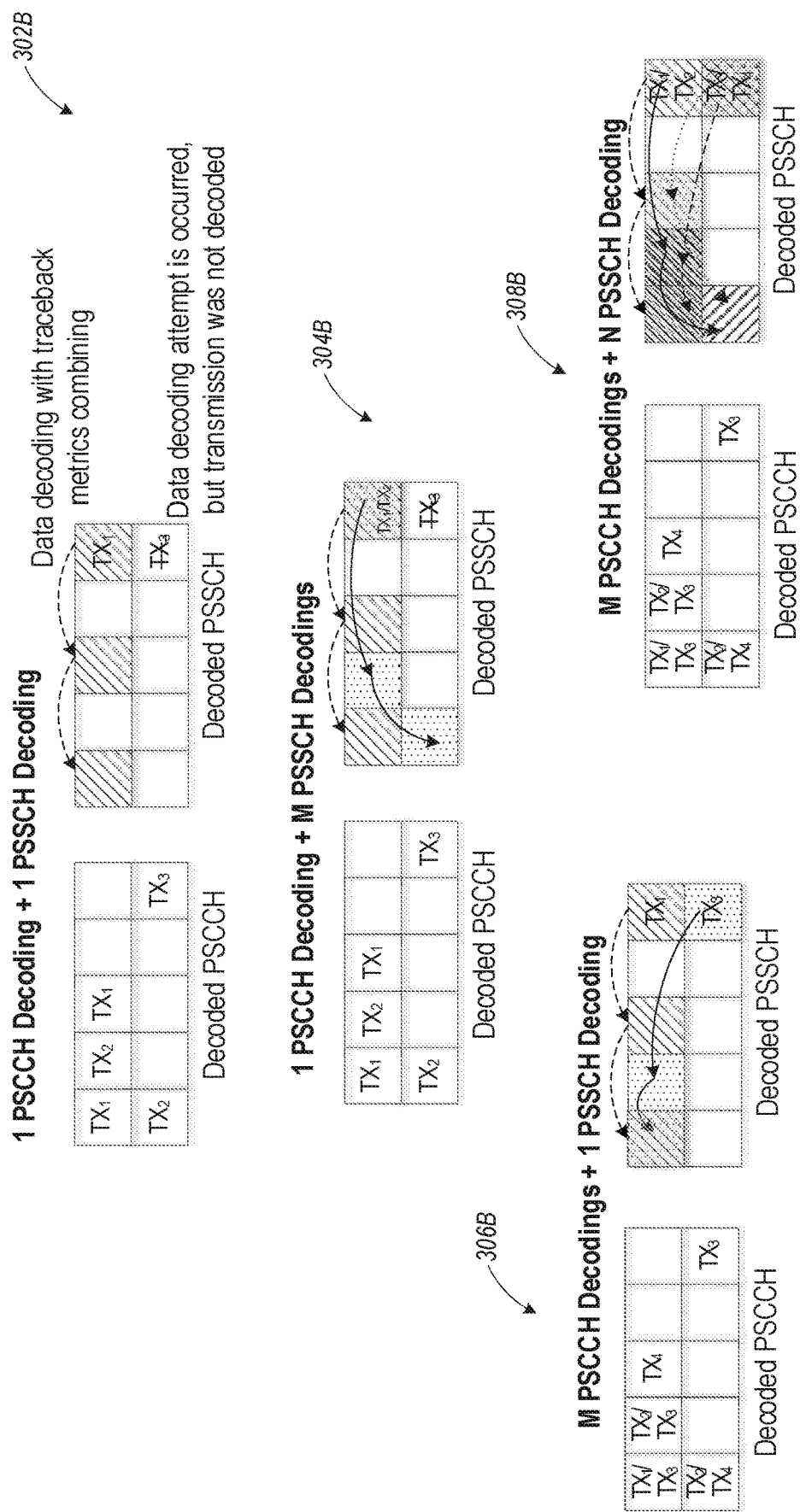
FIG. 3B illustrates decoding capability impact and UE processing behaviors, in accordance with some aspects.

FIG. 3B illustrates decoding capability impact and UE processing behaviors 302B-308B, in accordance with some aspects. Referring to FIG. 3B, UE processing behavior 302B (e.g., UE Behavior 1 described above) is associated with one PSCCH decoding and one PSSCH decoding. UE processing behavior 304B (e.g., UE Behavior 2 described above) is associated with one PSCCH decoding and multiple (e.g., M) PSSCH decoding attempts. UE processing behavior 306B (e.g., UE Behavior 3 described above) is associated with multiple (e.g., M) PSCCH decoding attempts and one PSSCH decoding. UE processing behavior 308B (e.g., UE Behavior 4 described above) is associated with multiple (e.g., M) PSCCH decoding attempts and multiple (e.g., N) PSSCH decoding attempts.

In some aspects, the following scenarios can be applicable when only two PSCCH resources are allocated within each slot. In terms of PSSCH decoding, the UE may perform either two or four PSSCH decoding attempts per slot. In summary, the following UE processing capabilities can be configured:

Case 1: Two PSCCH decoding per slot and two PSSCH decoding per slot; Case 2: Two PSCCH decoding per slot and four PSSCH decoding per slot; Case 3: Four PSCCH decoding per slot and two PSSCH decoding per slot; and Case 4: Four PSCCH decoding per slot and four PSSCH decoding per slot.

In some aspects, multiple PSCCH and PSSCH decoding attempts can significantly improve the performance of the NR-V2X sidelink communication and significantly improve system reliability.

Figure 4:
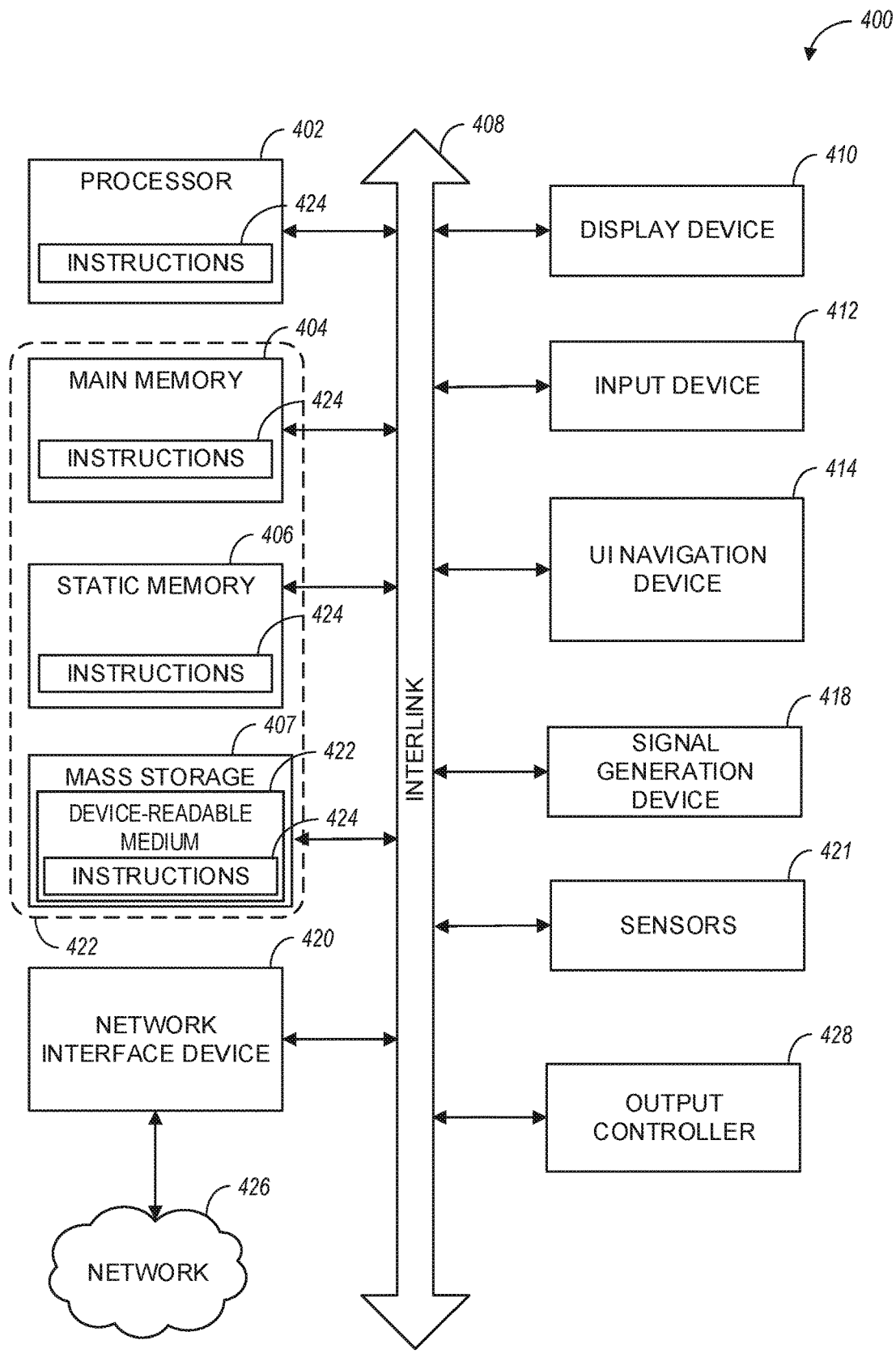
FIG. 4 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 4 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 400 may operate as a standalone device or may be connected (e.g., networked) to other communication devices.

Circuitry (e.g., processing circuitry) is a collection of circuits implemented in tangible entities of the device 400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to catty out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 400 follow.

In some aspects, the device 400 may operate as a standalone device or may be connected (e.g., networked) to other devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a LT, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 400 may include a hardware processor 402 (e.g., a central processing unit (CPU), a graphics processing unit (GPU), a hardware processor core, or any combination thereof), a main memory 404, a static memory 406, and mass storage 407 (e.g., hard drive, tape drive, flash storage, or other block or storage devices), some or all of which may communicate with each other via an interlink (e.g., bus) 408.

The communication device 400 may further include a display device 410, an alphanumeric input device 412 (e.g., a keyboard), and a user interface (UI) navigation device 414 (e.g., a mouse). In an example, the display device 410, input device 412 and UI navigation device 414 may be a touch-screen display. The communication device 400 may additionally include a signal generation device 418 (e.g., a speaker), a network interface device 420, and one or more sensors 421, such as a global positioning system (GPS) sensor, compass, accelerometer, or another sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 407 may include a communication device-readable medium 422, on which is stored one or more sets of data structures or instructions 424 (e.g., software) embodying or utilized by any one or more of the techniques or functions described herein. In some aspects, registers of the processor 402, the main memory 404, the static memory 406, and/or the mass storage 407 may be, or include (completely or at least partially), the device-readable medium 422, on which is stored the one or more sets of data structures or instructions 424, embodying or utilized by any one or more of the techniques or functions described herein. In an example, one or any combination of the hardware processor 402, the main memory 404, the static memory 406, or the mass storage 416 may constitute the device-readable medium 422.

As used herein, the term "device-readable medium" is interchangeable with "computer-readable medium" or "machine-readable medium". While the communication device-readable medium 422 is illustrated as a single medium, the term "communication device-readable medium" may include a single medium or multiple media (e.g., a centralized or distributed database, and/or associated caches and servers) configured to store the one or more instructions 424. The term "communication device-readable medium" is inclusive of the terms "machine-readable medium" or "computer-readable medium", and may include any medium that is capable of storing, encoding, or carrying instructions (e.g., instructions 424) for execution by the communication device 400 and that cause the communication device 400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 424 may further be transmitted or received over a communications network 426 using a transmission medium via the network interface device 420 utilizing any one of a number of transfer protocols. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input-multiple-output (SIMO), MIMO, or multiple-input-single-output (MISO) techniques. In some examples, the network interface device 420 may wirelessly communicate using Multiple User MIMO techniques.

The term "transmission medium" shall be taken to include any intangible medium that is capable of storing, encoding or carrying instructions for execution by the communication device 400, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus, comprising:
a memory; and
processing circuitry in communication with the memory, wherein, to configure a user equipment (UE) for vehicle-to-everything (V2X) sidelink communication, the processing circuitry is configured to:
determine a set of candidate resources of the UE from a sidelink resource pool, wherein the sidelink resource is divided into multiple time slots and frequency sub-channels;
perform first sensing on the set of candidate resources;
select a first plurality of transmission resources of the set of candidate resources based on the first sensing;
encode sidelink control information (SCI) for transmission to a second UE via a physical sidelink control channel (PSCCH), wherein the SCI indicates a reservation of the first plurality of transmission resources of the set of candidate resources;
after transmission of the SCI and before first transmission of an associated physical sidelink shared channel (PSSCH), perform second sensing on at least the first plurality of transmission resources, and select a second plurality of transmission resources of the set of candidate resources based on the second sensing; and
encode the associated PSSCH for transmission to the second UE using a plurality of transmission resources from the second plurality of transmission resources, wherein the PSSCH is encoded to include a transport block.

2. The apparatus of claim 1,
wherein the processing circuitry is further configured to:
perform channel quality measurements within a sensing window to determine the sidelink resource pool.

3. The apparatus of claim 2,
wherein the sensing window is configurable based on at least a maximum reservation interval associated with the V2X sidelink communication.

4. The apparatus of claim 1,
wherein the first sensing includes detecting announced resource reservations prior to transmission the SCI.

5. The apparatus of claim 1,
wherein the second sensing includes detecting announced resource reservations.

6. The apparatus of claim 1,
wherein the second plurality of resources includes a subset of the first plurality of resources.

7. The apparatus of claim 1,
wherein said selecting the first plurality of resources includes a random selection of resources.

8. The apparatus of claim 1,
wherein said selecting the first plurality of resources transmission is determined in part by a packet delay budget.

9. A non-transitory computer-readable storage medium that stores instructions for execution by one or more processors of a user equipment (UE), the instructions to configure the UE for New Radio (NR) vehicle-to-everything (V2X) sidelink communication, and to cause the UE to:
determine a set of candidate resources of the UE from a sidelink resource pool, wherein the sidelink resource is divided into multiple time slots and frequency sub-channels;
perform first sensing on the set of candidate resources;
select a first plurality of transmission resources of the set of candidate resources based on the first sensing;
encode sidelink control information (SCI) for transmission to a second UE via a physical sidelink control channel (PSCCH), wherein the SCI indicates a reservation of the first plurality of transmission resources of the set of candidate resources;
after transmission of the SCI and before first transmission of an associated physical sidelink shared channel (PSSCH), perform second sensing on at least the first plurality of transmission resources, and select a second plurality of transmission resources of the set of candidate resources based on the second sensing; and
encode the associated PSSCH for transmission to the second UE using a plurality of transmission resources from the second plurality of transmission resources, wherein the PSSCH is encoded to include a transport block.

10. The non-transitory computer-readable storage medium of claim 9,
wherein the first sensing includes detecting announced resource reservations prior to transmission the SCI.

11. The non-transitory computer-readable storage medium of claim 9,
wherein the second sensing includes detecting announced resource reservations.

12. The non-transitory computer-readable storage medium of claim 9,
wherein the second plurality of resources includes a subset of the first plurality of resources.

13. The non-transitory computer-readable storage medium of claim 9,
wherein said selecting the first plurality of resources includes a random selection of resources.

14. The non-transitory computer-readable storage medium of claim 9,
wherein said selecting the first plurality of resources transmission is determined in part by a packet delay budget.

15. A method, comprising:
determining a set of candidate resources of a user equipment (UE) from a sidelink resource pool, wherein the sidelink resource is divided into multiple time slots and frequency sub-channels;
performing first sensing on the set of candidate resources;
selecting a first plurality of transmission resources of the set of candidate resources based on the first sensing;
encoding sidelink control information (SCI) for transmission to a second UE via a physical sidelink control channel (PSCCH), wherein the SCI indicates a reservation of the first plurality of transmission resources of the set of candidate resources;
after transmission of the SCI and before first transmission of an associated physical sidelink shared channel (PSSCH), performing second sensing on at least the first plurality of transmission resources, and select a second plurality of transmission resources of the set of candidate resources based on the second sensing; and
encoding the associated PSSCH for transmission to the second UE using a plurality of transmission resources from the second plurality of transmission resources, wherein the PSSCH is encoded to include a transport block.

16. The method of claim 15,
wherein the first sensing includes detecting announced resource reservations prior to transmission the SCI.

17. The method of claim 15,
wherein the second sensing includes detecting announced resource reservations.

18. The method of claim 15,
wherein the second plurality of resources includes a subset of the first plurality of resources.

19. The method of claim 15,
wherein said selecting the first plurality of resources includes a random selection of resources.

20. The method of claim 15,
wherein said selecting the first plurality of resources transmission is determined in part by a packet delay budget.

* * * * *